US011228541B1

(12) United States Patent
Rubadeau et al.

(10) Patent No.: US 11,228,541 B1
(45) Date of Patent: Jan. 18, 2022

(54) COMPUTER SERVICE FOR HELP DESK TICKET CREATION AND RESOLUTION IN A COMMUNICATION PLATFORM

(71) Applicants: Atlassian Pty Ltd., Sydney (AU); Atlassian Inc., San Francisco, CA (US)

(72) Inventors: Tristan Rubadeau, Austin, TX (US); Komran Rashidov, Austin, TX (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/153,181

(22) Filed: Jan. 20, 2021

(51) Int. Cl.
*H04L 12/58* (2006.01)
*G06F 40/186* (2020.01)
*G06F 40/35* (2020.01)
*G06F 40/205* (2020.01)

(52) U.S. Cl.
CPC ............ *H04L 51/02* (2013.01); *G06F 40/186* (2020.01); *G06F 40/205* (2020.01); *G06F 40/35* (2020.01); *H04L 51/046* (2013.01); *H04L 51/22* (2013.01)

(58) Field of Classification Search
CPC ....... H04L 51/02; H04L 51/046; H04L 51/22; G06F 40/35; G06F 40/186; G06F 40/205
See application file for complete search history.

(56) References Cited

U.S. PATENT DOCUMENTS

| 8,135,612 | B1* | 3/2012 | Scudder | G06Q 10/063112 |
| | | | | 705/7.14 |
| 9,177,318 | B2* | 11/2015 | Shen | G06N 3/006 |
| 2006/0178918 | A1* | 8/2006 | Mikurak | G06Q 10/06375 |
| | | | | 705/7.25 |
| 2020/0310842 | A1* | 10/2020 | Yen | G06F 11/366 |

* cited by examiner

*Primary Examiner* — Kristie D Shingles
(74) *Attorney, Agent, or Firm* — Brownstein Hyatt Farber Schreck, LLP

(57) ABSTRACT

Embodiments include a computer implemented method for automatically identifying an issue from a help message received via a chat interface and generating a response for responding to the help message. The method can include receiving one or more response templates that each include a reference to a resource associated with a help topic. The method can also include receiving, from a second user, a help request via the chat interface of a help channel. In response to receiving the help request the method can include parsing the help request to identify a help topic, generating a help desk ticket associated with the help request and generating a response message that includes an information resource associated with the help topic, and sending the response message to the user. In response to the user viewing the information resource and selecting a user interface element, the method can include automatically closing the help desk ticket.

19 Claims, 17 Drawing Sheets

DETAIL AA

| Title | Times Used | Content Collaboration Platform (https://answers.net) | |
|---|---|---|---|
| How to connect to SSO | 4 | October 30, 2020, 12:46 PM | Enabled |
| How to connect to the VPN | 0 | September 17, 2020, 8:52 AM | Enabled |
| How -to articles | 0 | September 24, 2020, 4:31 PM | Enabled |
| Knowledge Base | 0 | September 24, 2020, 4:31 PM | Enabled |
| The credit card processing rate is 2.9% plus 30 cents per transaction. | 0 | October 30, 2020, 11:47 AM | Enabled |
| TheSpringfield wifi is: | 1 | May 21, 2020, 5:14 PM | Enabled |
| This is a new answer: http://www.google.com | 0 | September 29, 2020, 2:46 PM | Enabled |
| Troubleshoot and reboot router | 0 | September 24, 2020, 4:31 PM | Enabled |
| Troubleshooting articles | 0 | September 24, 2020, 4:31 PM | Enabled |

COMPUTER SERVICE FOR HELP DESK TICKET CREATION AND RESOLUTION IN A COMMUNICATION PLATFORM

FIELD

The described embodiments relate generally to methods, techniques, and systems for identifying, generating and responding to information technology help desk tickets. More particularly, the present embodiments relate to processes for automatically identifying and responding to technology help requests using a chat based interface.

BACKGROUND

Organizations may compile and manage one or more information networks that include information related to the organization's technology infrastructure or other resources. The information network can include content generated by various users of the information network, which may be formatted, presented or otherwise hosted in a variety of ways. For example, each user of the information network can customize the type of information, how it is presented and the content of the information in a different way. A user wanting to access information on a particular topic may struggle to find relevant information due to variances between content provided by other users, or may need to search through multiple resources before finding a solution that is helpful. In some cases, it may be desirable to have systems and interfaces that help identify and locate resources that are relevant to a user's particular needs.

SUMMARY

Embodiments are directed to a computer implemented method for automatically identifying an issue from a help message received via a chat interface and generating a response for responding to the help message. The method can include receiving a first response template from a first user, where the first response template includes a first reference to a first information resource associated with a first help topic and receiving a second response template from the first user, where the second response template includes a second reference to a second information resource associated with a second help topic. The method can also include receiving, from a second user, a help request via the chat interface of a help channel, where the help request includes a message and a user identifier. In response to receiving the help request at the help channel, the method can include parsing the help request to identify a help topic based on one or more keywords contained in the help request. The help topic can correspond to one of the first help topic or the second help topic. The help topic an include generating a help desk ticket associated with the help request, where the help desk ticket comprises a status identifier indicating that the help desk ticket is active. The method can include generating a response message that includes prompting the first user to select one of the first response template or the second response template; extracting the user identifier and a portion of the message; and updating the selected one of the first response template or the second response template to include the extracted portion of the message and the user identifier. The method can include sending the response message to the second user, where the response message includes the status identifier as being active and a user interface element that allows the second user to indicate that the response message solved the help request. In response to the second user selecting the user interface element, the method can include updating the status identifier of the help desk ticket to closed.

Embodiments are also directed to a computer implemented method for automatically generating a response to a help request where the response includes one or more information resources related to an issue identified in the help request. The method can include receiving the help request from a user at a chat interface of a help channel, parsing the help request to identify a help topic based on identifying one or more keywords in the help request, and generating a help desk ticket and indicating a status of the help desk ticket as active. The method can also include identifying a response template at least partially based on the one or more keywords, where the response template includes a set of embedded functions and a reference to an information resource associated with the help topic. The method can include generating a response message using the response template, where the set of embedded functions include information related to the user and a reference to the help topic; displaying the response message at the chat interface; and in response to the user interacting with the information resource, prompting the user to indicate, using a selectable interface element, whether the information resource resolved the help request. If the user indicates that the information resource resolved the issue, the method can include closing the help desk ticket, and if the user indicated that the information resource did not solve the issue, the method can include providing a different information resource to the user, where the different information resource related to the identified help topic.

Embodiments are further directed to a computer implemented method for identifying an issue from a help message received via a chat interface and generating a response to the help message. The method can include receiving, from a first user, a help request via the chat interface of a help channel, the help request comprising a user identifier and a description of the issue. In response to receiving the help request at the help channel, the method can include parsing the help request to identify a help topic based on one or more keywords contained in the help request, generating a help desk ticket associated with the help request, where the help desk ticket includes a status identifier indicating that the help desk ticket is active, and generating a response message. Generating the response message can include identifying a first response template and a second response template that each include an information resource associated with the help topic, prompting a second user to select one of the first response template or the second response template for generating the response message, extracting, the user identifier and the description of the issue from the help request, and updating the selected one of the first response template or the second response template to include the user identifier and the description of the issue. The method can also include sending the response message to the first user, the response comprising a selectable interface element, that when selected, causes the information resource to be displayed on a device associated with the first user.

BRIEF DESCRIPTION OF THE DRAWINGS

The disclosure will be readily understood by the following detailed description in conjunction with the accompanying drawings, wherein like reference numerals designate like structural elements, and in which:

FIG. 5 shows a detailed view of an example interface for selecting and managing response templates;

FIG. 13 shows an example chat interface that allows a user to close a ticket associated with a help request or request additional help;

DETAILED DESCRIPTION

Figure 1:
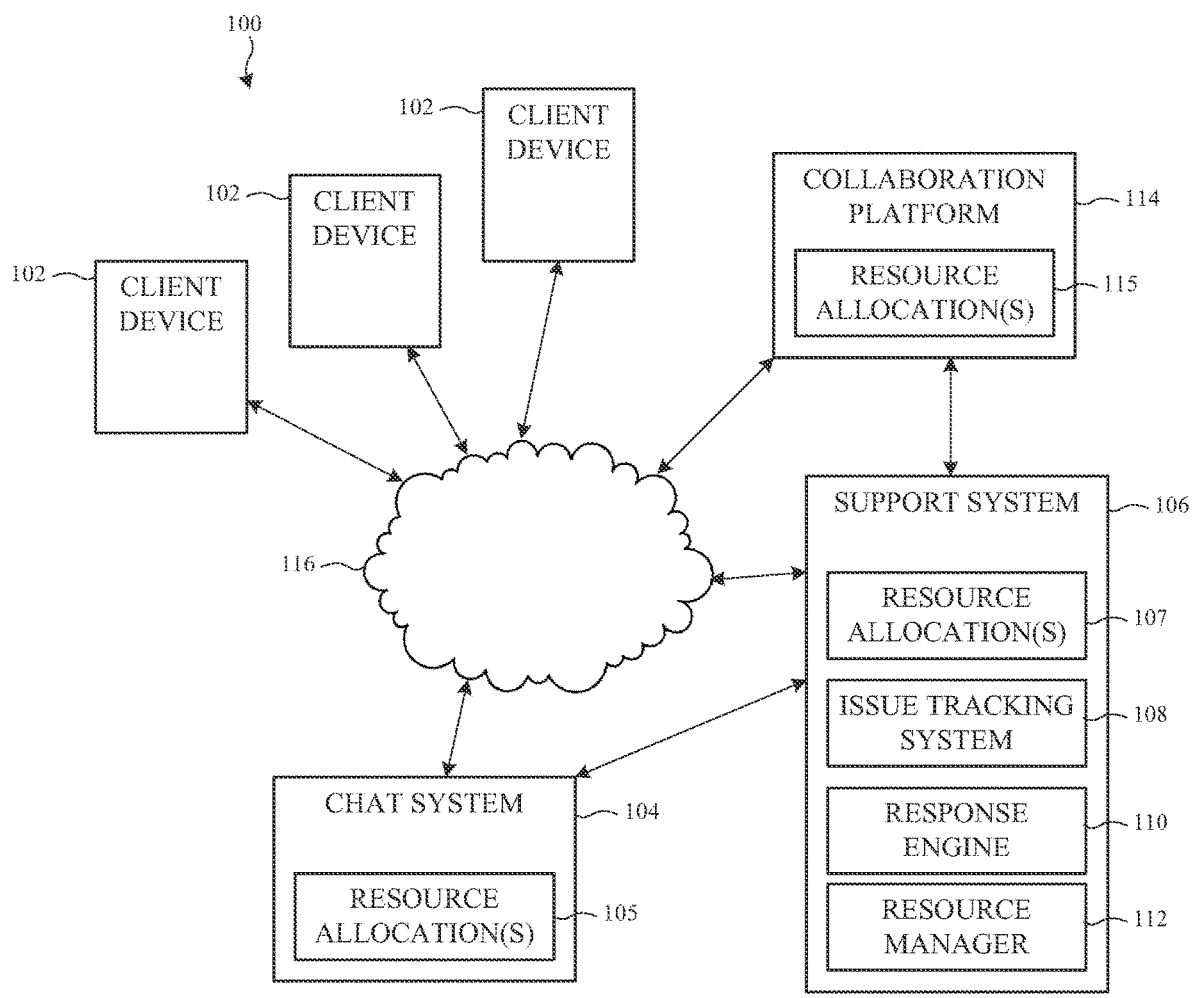
FIG. 1 shows an example network system for automatic help desk ticket creation and resolution.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

An organization may utilize information technology (IT) systems for a wide variety of tasks. For example, an organization may have one or more remote desktop systems that employees can log into to access files, services, programs or other technology systems used by the organization. A variety of different issues typically arise for users of an organization's IT systems. In many cases, an organization implements an IT help service to help users as IT issues arise. In some cases, the organization may use an issue management system (which may also be referred to as an issue tracking system) to address the IT issues. The organization may also manage one or more systems such as a collaboration platform that contains information resources related to various IT issues or topics. As used herein the term "a collaboration platform" is used to refer to information that is generated by various users that is formatted, presented or otherwise provided by user's in a variety of ways. For example, each user providing information resources on a collaboration platform may decide the type of information, the scope of information, the formatting such as text, audio, video, its organization or presentation, and so on. Accordingly, information resources hosted on the collaboration platform may not have a unified structure that can be used to organize and categorize the relationship between different resources. In some cases, the collaboration platform can also be referred to as a collaboration system.

When an issue arises, whether due to a user request or other IT issue, the IT help service may access information resources in the collaboration platform or other databases to help solve the issue. For example, an employee of an organization may contact the IT help services for assistance, and IT support staff may locate a relevant information resource from a knowledge database and use that resource to address the employee's issue. In many cases, a significant portion of the IT help service's resources can be dedicated to locating relevant information resources and assisting users of the organization's IT systems with issues that arise. In some embodiments, the organization may utilize a chat system which is used by various users of the organization to communicate with IT help services. However, as typically implemented, a chat system may not provide access to relevant resources and IT help services may still need to invest significant time to locate relevant information resources and guide a user through the appropriate solution.

Embodiments disclosed herein are directed to systems and methods for managing and responding to help requests using a chat-based communication platform. A user can initiate a help process by using the chat system to submit a help request to a help desk system. The help request can be formatted as a freeform message in which the user provides their own description of their issue. In some cases, submitting the help request to a specific address or submitting the help request in a specific chat channel may automatically initiate one or more processes to address the user's help request. For example, receiving a help request at a specific channel, such as an IT support channel of the chat system, can cause the help desk system to automatically generate a help desk ticket and associate that ticket with the help request. In some cases, the help desk ticket may be managed using a ticket tracking system, such as those known in the art.

Receiving the help request and generating the help desk ticket can also initiate a response process that provides a response message to the user's help request. As part of the response process, the help desk system may evaluate the user's description of the issue contained in the help request. In some cases, this may include identifying keywords, using natural language processing or the like to identify one or more issues raised by the user. For example, if a user includes words such as "single sign-on" or "SSO" in their help request, the help system may identify that the user is having an issue logging into a system using their single sign-on credentials. The help system can associate the identified issue with one or more help topics. For example, upon determining that a/the user is having an issue with their single sign-on, the help system may associate a single sign-on help topic with the help request. Additionally, the help system can associate the help request with other help topics, such as a user authentication help topic, or the like.

The help topics associated with a particular help request may be used to identify one or more information resources that can be provided to the user as a first step in addressing the issue identified in their help request. In some cases, a support user group can create one or more response templates that are used to respond to a help request. As used herein the term "a support user group" is used to refer to the various IT support-side personnel that manage, troubleshoot, provide user support or otherwise work to ensure that an organization's IT system is working properly. The templates can include one or more information resources that are associated with a help topic identified from the help request. For example, if a single sign-on help topic is associated with a help request, a template including one or more information resources related to single sign-on, user authentication, login procedures, and/or the like can be selected for preparing a response message to the user. In some cases, the information resource may be pulled from a knowledge database managed by the organization, and may include text resources, audio resources, video resources, or the like. The information resource can be edited, modified, or converted to different formats by users in the support user group. For example, an IT user associated with the support user group may access a text resource from the knowledge data base and modify the resource by shortening it to create a more succinct version of the resource. In other cases, an IT user could use the information in the text based resource to create an audio or video guide on how to troubleshoot a certain issue.

In some cases, the template can include one or more embedded functions that can be filled with information associated with a specific help request. For example, the embedded functions can include information identifying the specific user that made the help request, such as a name of the user, a username, ID code, and so on. In some cases, the one or more embedded functions could include additional information related to the help request such as a help desk ticket reference, information about a specific piece of equipment a user is having issues with, and so on.

Upon receiving the help request, the help system can also send one or more templates to an IT user of the support user group. The template suggestions can be based on comparing the one or more help topics that are identified from the help request to help topics associated with each of the response templates. For example, if a single sign-on help topic is identified for a help request, the help system can locate templates that are related to single sign-on, user authentication, or the like and send those templates to an IT user to use in responding to the help request. In some cases, the templates may include metadata associated with each template to select a specific template.

In response to an IT user selecting the desired template, a response message can be generated and sent via the chat interface. For example, the system can update the embedded functions in the template with the information from the help request to include information such as a name of the user, information about the issue that the user is experiencing, time and date information, information related to a specific piece of hardware or software, and so on.

In some cases, a user's interaction with the response message can be monitored to determine whether the information resource included in the template helped resolve the user's issue. For example, the response message can include a user interface element for the user to close the help ticket. If the user views the information resource and then closes the help ticket, the system can interpret this as the information resource helping the user solve the issue. In other cases, the system can include an option for the user to explicitly indicate whether the information resource helped solve the issue. For example, the response message can include a user interface elements that allow the user to select whether the information resource helped solve their issue. In some cases, the system can solicit feedback from the user such as in the form of a rating of the effectiveness of the response message in addressing his or her help request.

In some cases, the help system can automatically generate and send a response message in response to receiving a help request via the chat system. Upon receiving the help request, the help system can be configured to identify a help topic and identify one or more information resources associated with the help topic. The system can send a response message via the chat system, and the response message can include a reference to the information resource(s) associated with the help topic. In some cases, the reference can include a link that directs the user to the information resource. In other cases, the information resource can be contained in the response message as text, audio, video, or other suitable format.

In cases where multiple information resources are included in a response message, the system can display a first one of these resources and an option for the user to view another one of the resources. The multiple resources can be scored and presented to a user based on each of their scores. In some cases, a score of the resource can be adjusted based on whether the resource helped resolve the help request and/or a rating provided by the user.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 shows an example issue management system 100 for automatic help ticket creation and resolution. The issue management system 100 can be implemented with one or more client devices 102, that communicably couple (e.g., via one or more networking wired or wireless communication protocols) to a chat system 104, and a support system 106.

In various embodiments, the issue management system 100 is configured to operate within or as a virtual computing environment that is supported by one or more physical servers including one or more hardware resources such as, but not limited to (or required to be) one or more of: a processor; a memory; computer-readable memory or other non-volatile storage; networking connection; and the like, such as those in the electrical block diagram 1600 described with reference to FIG. 16. It may be appreciated that although these functional elements are identified as separate and distinct devices (e.g., servers) that can each include allocations of physical or virtual resources (identified in the figure as the resource allocations 105, 107, and 115 respectively), such as one or more processors, memory, and/or communication modules (e.g., network connections and the like), such an implementation is not required. The issue management system 100 can leverage such resources to instantiate a number of discrete subservices or purpose-configured modules, containers, or virtual machines each configured to perform, coordinate, serve, or otherwise provide one or more services, functions, or operations of the issue management system 100, such as a chat system 104, a support system 106, and a collaboration platform 114. The chat system 104 and the support system 106 may be referred to herein as application platforms or simply platforms, which can reside on the same host server, or in other implementations, they may reside or be provided by a separate or discrete servers.

The chat system 104 can be implemented as a chat-based communication platform that provides a system for various users within and external to an organization to communicate via a text-based interface. The chat system 104 can organize communications between different users in a variety of ways. In some cases, text conversations between users can be organized by topic, by private groups, and/or by direct messaging between users. As used herein the term "channel" is used to refer to an organized conversation thread such as a topic-based thread, a private group thread, a direct-messaging thread, or the like. Channels can be set up based on project teams, organization roles (e.g., IT, legal, human resources, sales, engineering, and so on), or the like. In some cases, one or more support channels can be created that provide an interface for users of the system to receive help with various issues. For example, the chat system 104 can include an IT support channel that provides a dedicated channel for users to submit their IT issues and for IT support staff to receive and address these issues. An IT support channel is provided as one example of a support channel, and the concepts described herein can be applied to other types of support channels such as support channels dedicated to specific topics and/or departments within an organization such as human resources, legal, engineering, login support, and so on. In some cases, the chat system 104 can include one or more non-dedicated channels such as a channel(s) that are part of a video conferencing application, or channels that are part of another non-chat application or service.

The chat system 104 can associate each user with one or more user accounts, which may include information related to each user. This information may include a user's role in the organization, channels that a user is associated with, information related to permissions of the user such security level or for managing access to different resources such as files, or other information. The chat system 104 can also associate users with different groups which can provide different chat features. For example, the chat system 104 can include a user group that includes users of the system who use the system as a tool/resource to carry out their jobs. The chat system 104 can include a support user group that includes users who provide support to the IT systems of an organization such as providing support to issues that arise. In some cases, different user interfaces, interface options, or information is available to a user based on his or her associated user group(s).

The chat system 104 can interface with a support system 106. The support system 106 may be used by a specific group such as an IT support group to track and resolve issues that arise within an organization's technology infrastructure. The support system 106 can include an issue tracking system 108 that is used to manage issues submitted by various users of the system 100. Users can submit help requests, and the issue tracking system 108 can generate a help ticket that is used to identify and manage the help request. In some cases, a user can submit a help request to the chat system 104 using their client device 102. The issue tracking system 108 can alert or forward the help request to an IT support staff. In some cases, the issue tracking system 108 can assigns different statuses to an issue such as an active, closed, in process, and so on. The issue tracking system 108 can also track a timing associated with an issue such as when it was submitted, how long it took to resolve, whether it is pending, and so on. In some cases, the issue tracking system 108 can assign a timeline for resolving an issue. The issue tracking system 108 can also assign a different important and/or urgency level to an issue.

The support system 106 can also include a response engine 110 which is used to generate responses to help requests. The response engine 110 can interface with the issue tracking system and can be configured to evaluate help messages to identify one or more issues from the help message. The response engine can be configured to perform keyword identification, natural language processing, or suitable techniques that parse a help request. For example, a user can submit a help request via the chat system 104, and the help request can include user-entered text that identifies the user's issue. The response engine 110 can be configured to parse the user-entered text to identify an issue that the user is experiencing. The response engine 110 can associate the issue with one or more help topics, which can be used to address the help request. For example, the help topics can be used to identify information resources that can be provided to the user in a response message to the help request.

The support system 106 can include a resource manager 112 that can interface with a collaboration platform 114 to manage and/or generate information resources that can be included in a response message to a help request. In some cases, the resource manager can be configured to locate information resources related to a particular help topic. This can include associating information resources with one or more help topics. For example, the resource manager 112 can evaluate and/or generate metadata for information resources that correspond to one more help topics, or that characterizes a subject, content, or other characteristics of a particular information resource. Additionally or alternatively, the resource manager 112 can be used to modify, edit, convert or otherwise alter information resource from the collaboration platform 114. For example, the resource manager 112 can pull information resources from the collaboration platform 114 and allow a user to modify and/or generate a new information resource based on information contained in the retrieved resource. This can include shortening an information resource to remove less relevant, redundant and/or off-topic information, taking information from the information resource and converting it to a different format, and so on.

The resource manager 112 can also score information resources. In some cases, this can include associating a score for a resource with a particular help topic. In this regard, when one or more help topics are identified for a particular help request, the resource manager 112 can identify and provide information resources based on their score associated with that help topic. The resource manager 112 can update these scores based on user interaction with a resource, user rating, or other user feedback.

Figure 2:
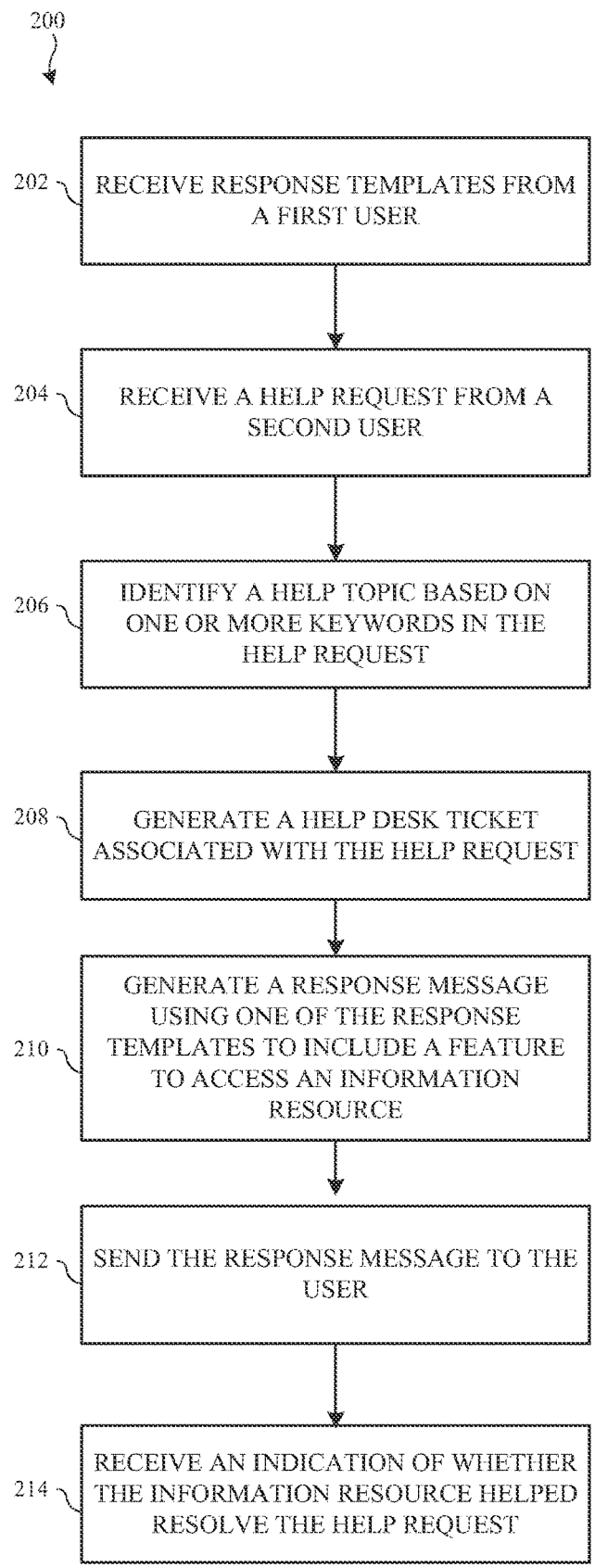
FIG. 2 shows an example process for generating a help desk response message based on a response template.

FIG. 2 shows an example process 200 for generating a help desk response message based on a response template. The process may be performed by an issue management system such as the issue management system 100 described herein.

At step 202, the process 200 can include receiving a response template from an IT support user. The response template can be formatted as a chat message that can be sent using a chat system such as the one described herein. The response template can be created by the IT support user. In some cases, the response template can be created using a dedicated template creation editor such as those described with reference to FIGS. 8 and 9. The response message can include one or more embedded functions that can automatically populate with information from a help request. The embedded functions can be configured as embedded commands and/or wild card fields that can be used to populate portions of the template with information associated with a particular help request. For example, the embedded functions can be configured to include a name of a person who submitted the help request and/or other information contained in a help request. In some cases, the response template can reference and/or include an information resource associated with a help topic. For example, an IT user can create a response template to address issues that commonly arise. In this regard, a particular response template may be generated to address a specific IT issue.

In some embodiments, one or more IT support users can generate multiple different templates. Different templates can be intended to address different issues. Each different template can be associated with one or more help topics. In some cases, each template may include data such as metadata that is used to identify a help topic for the template or other information that may be used by an issue management system to associate the template with a specific IT issue or help topic. For example, each template can be associated with one or more keywords that are used to identify a help topic or other information about the template. In some cases, various response templates can be viewed and/or organized according to their help topic, for example, by organizing the response templates according to their keywords. In some cases, response templates can be scored from user feedback and/or feedback from IT support users, and the response templates can be organized or ranked according to their respective scores.

At step 204, the process 200 can include receiving a help request. The help request can be submitted by a user through a chat system, such as the chat system described herein, and identify an issue that the user would like help with. In some cases, the help request can be submitted to a dedicated IT help channel that is intended for users to submit the IT help requests. The help request can be one of a series of messages from a user. The help request may be identified using textual analysis of the one or more of the messages, for example, by identifying keywords or phrases in one of the messages. For example, key words or phrases can include a help topic, specific words such as "help", and so on. In some cases, the help request can include information spanning multiple messages from a user. The help request and/or channel information can be analyzed to generate metadata that is associated with the help request, such as an identifier of the user, time and date the request was created, information about the user's role in the organization, and so on. The help request can also include a message portion that includes a description of the issue that is submitted by the user in the chat interface. The message portion can be freeform and the user creating the request may include text, icons, audio, and or video. In some cases, including a specific icon in the message may perform one or more functions such as automatically classifying the message as a help request. In other cases, submitting the message to a specific channel such as an IT support channel can automatically classify the message as a help request.

At step 206, the process 200 can include identifying a help topic based on an analysis of the message, metadata associated with the message, channel information, or the like. For example, a help request message can be analyzed to identify one or more keywords. In some cases, this can include the issue management system parsing a text portion of the message to identify an issue or a help topic. The parsing can be performed by using keyword recognition, natural language processing, or other suitable methods.

At step 208, the process 200 can include generating a help desk ticket for the help request. In other cases, the help desk ticket can be generated after or as part of creating a response message. The help desk ticket can be created by extracting information from the help request such as an issue that the user is experiencing or identifying a help topic and transmitting this information with an issue create request to an issue tracking system. The help desk ticket can include an identifier such as a ticket number that is used to identify the particular help request. In some cases, the help desk ticket can be automatically generated from messages received at a specific channel. For example, one or more channels can be configured for receiving and addressing IT issues. In some cases, after determining that a message sent through one of these channels is a help request, the system can automatically open a help desk ticket with an issued tracking system. In some cases, a message received at an IT help channel can initiate a message thread in which communications associated with that help request can be organized in a specific thread. For example, when a help desk ticket is created in response to the help message, the help desk ticket can be displayed in a message thread that is associated with that specific help request. In some cases, the message thread or other portion of the chat interface can also include a status identifier for the help request. For example, when a help request is initially submitted to the help channel, the issue tracking system can assign an active status to the help request and this status can be identified in the message thread associated with the help request.

At step 210, the process 200 can include generating a response message for responding to the help request. The response message can be sent using the chat system. Generating the response message can include identifying one or more templates based on metadata associated with the help request. The metadata can include information related to a help topic (or issue) identified in the help request. Identifying the template(s) can include matching information from the help request metadata to one or more parameters associated with each response template. For example, an IT support user can associate particular help topics, keywords, phrases or a combination thereof with a particular response template, which can be used to generate metadata for each response template. This metadata can be used to identify one or more response templates for responding to a help request. The identified templates can be sent to an IT user of the system who can select a template for generating the response message. In some cases, the system can identify more than one template that is associated with a particular help topic that is associated with a help request. In these cases, the IT support user may be prompted to select the desired template. The identified templates may include or reference information resources that are related to the identified help topic.

In some cases, the response templates can be associated with a technical level and identifying the response template(s) can be based on this technical level. The metadata associated with the help request may include an indication of a technical profile of the user. Accordingly, the system may identify response templates based on the technical profile of the user. For example, the system may identify response templates that include information resources that have a higher technical level for users who have higher technical profile. In some cases, a technical profile of the user can be used to identify response templates based on the amount and/or presentation of an information resource associated with a template. For example, the system can identify response templates that include shortened and/or step-by-step instructions for users associated with a lower technical profile.

Step 210 can also include extracting information from the help request such as a user identifier, which can include a name or other ID associated with the user who submitted the help request. The information can be extracted based on one or more embedded functions contained in the selected response template. For example, if the response template includes an embedded function for including the user's name who submitted the request, the help message can be analyzed to extract the user's name. The extracted information may include an issue that was determined based on analyzing the message portion of the help request, one or more help topics associated with the issue, a specific piece of hardware, software or other device that was included in the help request, or a combination thereof.

The response message can be created by updating the selected template such that the embedded commands extract information from the help request, the channel, an external source such as a collaboration platform, or the like. In some cases, the information resource can be included directly in the response message, for example, as a text section that describes one or more possible solutions for the help request. The information resource can include a series of steps that the user can perform, or any other suitable information. Additionally or alternatively, the response message can include a user interface element such as a link that when selected, pulls up the information resource for the user.

At step 212, the process 200 can include sending the response message to the user via the chat system. The response message and/or the chat system can display a status of the help request. For example, the status can be indicated as active until it is determined that the help request has been addressed. In some cases, the response message can include a user interface element that allows the user to indicate that their help request has been resolved. For example, the user receiving the response message may use the information resource to solve their issue. In response, the user can select the interface element in the response message to indicate that they no longer need help with their help request.

At step 214 of the process 200, the issue tracking system may receive an indication that the user's help request has been solved and update the help desk ticket status to closed. Accordingly, the process 200 may be used to automatically generate a help desk ticket, identify information resources that may be relevant to a specific help request, generate a response message, and resolve the help desk ticket.

Figure 3:
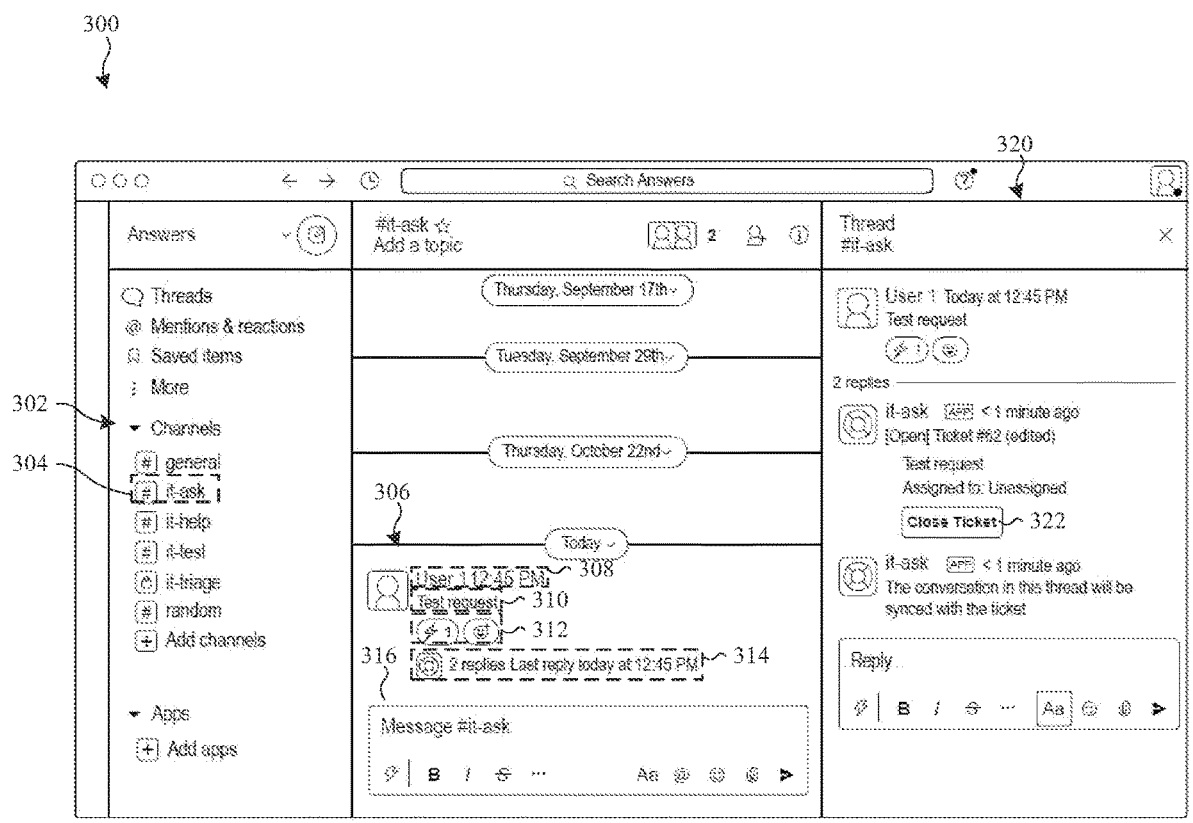
FIG. 3 shows an example chat interface that can be used to submit a help request.

FIG. 3 shows an example chat interface 300 that can be used to submit a help request. The chat interface 300 can include one or more regions or panes that are used to display different information to a user and can include various interface elements that can be selected by a user to perform different functions. For example, the chat interface 300 can include a channels pane 302 that allows a user to select different channels for messaging other users and/or the issue management system. The chat interface 300 can include an IT channel 304 (e.g., "# it-ask") that a user can use to submit a help request. In response to selecting the IT channel 304, the chat interface 300 can include a chat pane 306 that allows the user to type in their issue and submit it to the issue tracking system described herein.

The chat pane 306 can include user data portion 308, a submitted message portion 310, and icon portion 312, a message summary 314 portion, and messaging interface 316. The user data portion 308 can include information about the user and/or the information related to the message, such as time the help request was created, which can be stored as metadata related to the help request. The submitted message portion 310 can include messages that have been submitted by the user. The icon portion 312 can include one or more icons that indicate information related to the help request, such as a status of the help request, or an urgency of the help request. In some cases, the icons can be associated with a specific function, for example, a specific icon can be used to designate the message as a help request. As used herein, the term "icon" is used to refer to user interface elements such as emoji's, reacjicons, or other visual interface elements that can be selected from a set of icons. In some cases, use of these icons can be used to designate a message as a help request, open a help desk ticket, perform some other function, or a combination thereof. The message summary portion 314 can include information about the response to the help request. For example, the message summary portion 314 can include that two replies have been made in response to the user's help request. The messaging interface 316 can be used by the user to type a message related to their issue. In some cases, a user can initiate a help request by typing a message in the messaging interface and submitting it to the IT channel 304.

The chat interface 300 can also include a thread pane 320 that displays the messages related to a specific help request. For example, a first message (e.g., "Test request"), which generated the help request, can be displayed at the top of the thread pane 320 and one or more response messages can be displayed below. In some cases, the thread pane 320 can provide a filtered view of the chat pane 306 that shows different information related to the help request. A first message can indicate that a help ticket has been created for the help request, and provide information related to the help ticket such as a ticket ID (e.g., "Ticket #62"). In some cases, the thread pane 320 can also include one or more embedded functions such as a selectable button for managing the help ticket. For example, the thread pane 320 can include a button 322 to close the ticket.

Figure 4:
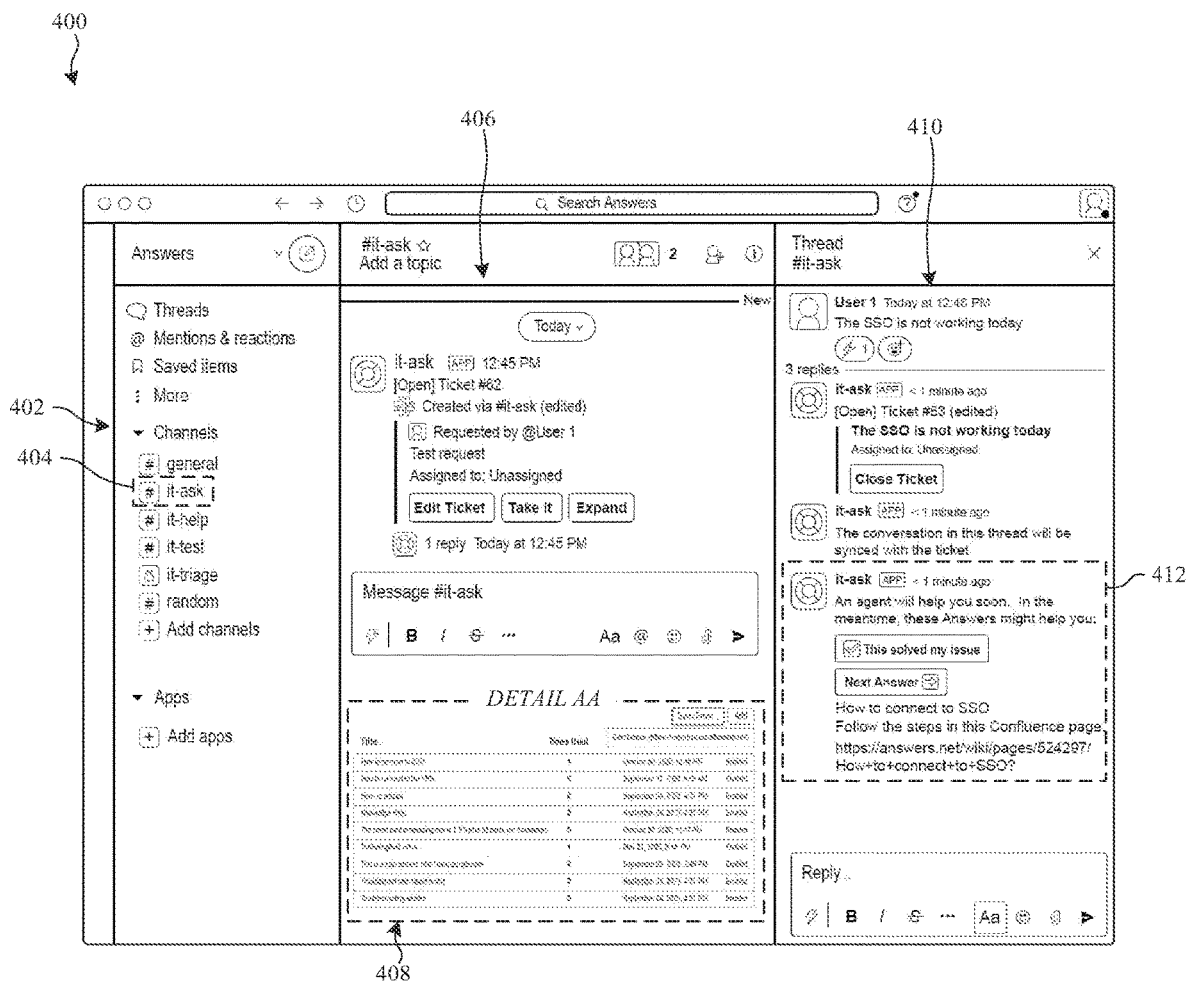
FIG. 4 shows an example chat interface that can be used by an IT support user to manage a help request.

FIG. 4 shows an example chat interface 400 that can be used by an IT support user to manage a help request. The chat interface 400 can include one or more regions or panes that are used to display different information to an IT support user and can include various interface elements that can be selected by an IT support user to perform different functions. In some cases, the chat interface 400 for an IT support user may be similar to interfaces for other users, and may vary primarily in the type and/or access to different information as comparted to other users. For example, the chat interface 400 can display information related to support systems described herein that are different from information displayed to a non-IT support user.

The chat interface 400 can include a channels pane 402 that allows the IT support user to select different channels, some of which may be associated with an issue tracking system, as described herein. The chat interface 400 can include an IT channel 404 (e.g., "# it-ask") that can be used to view and manager help requests submitted by other users. In response to selecting the IT channel 404, the chat interface 400 can include a chat pane 406 that allows the IT support user to view a help request.

The chat pane 406 can also include a messaging interface where the IT support user can type a message in response to the help request. The chat pane 406 can be used to carry out one or more steps in preparing a response message as described herein. For example, in response to receiving a help request the chat pane 406 can display a template interface 408 that displays one or more identified response templates that the IT support user can select for responding to the help request, which is further described in relation to FIG. 5.

The chat interface can also include a thread pane 410 that can be used by an IT support user to manage a help desk ticket associated with the help request, and prepare a response message. In some cases, the thread pane 410 can be used to carry out one or more steps in preparing a response message as described herein. For example, in response to receiving a help request the thread pane 410 can display a response message 412 before it is sent to the user. In this regard, an IT support user can review and/or edit the selected response message before submitting it in response to the help request.

FIG. 5 shows detailed view AA from FIG. 4 of an example interface 500 for selecting and managing response templates. The interface 500 can include a list 502 of identified response templates 504, one of which is labeled for simplicity. In some cases, the list 502 can include response templates 504 that are identified based on metadata associated with a help request, such as by correlating a help topic identified from analyzing a help request with a help topic that is associated with the response templates 504. In other cases, the interface can display a library of templates that are associated with an IT user. In other cases, the IT user can search, upload, filter, or other add additional templates or select a response template library. For example, the interface 500 can include a first selectable element 506 for synchronizing response templates from an external library or content collaboration platform. The user interface 500 can also include a second selectable element 508 that is used to generate a response template and/or generate a new response template. The interface can also include a collaboration platform identification pane 510 that displays a current collaboration platform that is being synchronized to the support system.

In some cases, list 502 of identified response templates 504 provides information about information resources that are synchronized with the support system. For example, the list 500 can include a title of each information resource, how often a particular resource has been used, or other information related to each information resource. In some cases, the list 502 can display a help topic associated with each information resource, an issue associated with a resource, a score assigned to each resource, and so on. In some embodiments, the information resources can be organized in the resource pane according to one or more of these parameters. For example, the list 502 can be configured to display information resources associated with a particular help topic and according to a score assigned to each of these resources.

Figure 6:
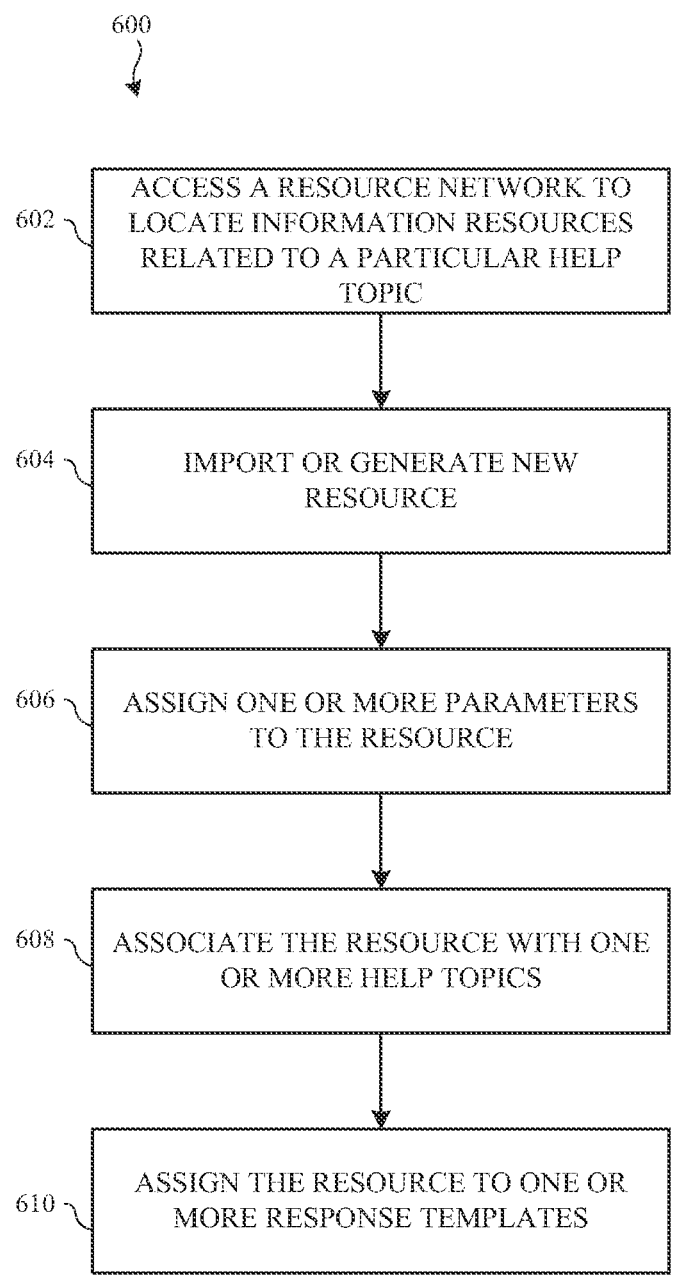
FIG. 6 shows an example process for managing and generating an information resource that can be included in a help desk request response message.

FIG. 6 shows an example process 600 for managing and generating information resources that can be included in a response message. In some embodiments, one or more information resource may be hosted by a collaboration platform. As described herein, the information resources contained in the collaboration platform can vary in formatting, amount of information, types of information, and so on. The process 600 may be used to locate and/or modify these information resources for inclusion in response messages.

At 602, the process 600 can include accessing a collaboration platform to locate one or more information resources related to a particular topic. In some cases, this can include an IT support user searching the collaboration platform for information resources related to a particular topic. In some cases, information resources can be located using search tools, based on metadata that associates an information resource with a particular issue and/or help topic, or using other suitable processes.

At 604, the process 600 can include importing and/or generating a new information resource based on an information resource located in the information network. This step of the process can include locating information resources that can be included in a response template such as the response templates described herein. In some cases, this can include importing an information resource into a support system such as the support system 106 such that it can be incorporated into a response template. In other cases, an information resource may be modified prior to importing it into the support system. For example, an original information resource could be in the form of an article, which can be used to generate a new information resource that includes a sequence of steps that a user can perform to address a particular issue. In other cases, an original information resource may be created by a user of the support system such as an IT support user. Information resources can include a variety of media formats such as text, audio, video, animations, slide shows, or the like. In some cases, step 604 can include converting information in a first format such as text to a second format such as audio or video. In other cases, step 604 can include creating a new information resource in a format such as video using an information resource that is presented in another format such as text. For example, a shortened version of an information resource can be created, which may be useful for providing a succinct set of directions for solving a particular issue. In some cases, the shortened version may be generated as an information resource and associated with a response independent template. In other cases, the shortened version could be associated with the original resource and be presented as a selectable option in the user interface to provide for the user.

At 606, the process 600 can include assigning one or more parameters to the information resource. For example, the parameters can include characterizing a type of information contained in the resource, naming the resource, a creation date, summary of resource, keywords or phrases associated with the resource, or other suitable information that can be used to locate, identify or associate the resource with a particular issue or help topic. The parameters assigned to each information resource may be stored as metadata.

At 608, the process 600 can include associating the information resource with one or more help topics. In some cases, this can be done manually by an IT support user. In other cases, the parameters such as metadata assigned to an information resource generated at step 604 can be used to associate one or more help topics with a particular information resource. In some cases, the help topics may be stored as additional metadata that is assigned to the information resource and used to locate information resources that are related to an identified help topic from a help request as described herein. In some cases, the help topics may be assigned by an IT support user, for example by associating particular keywords with an information resource.

At 610, the process 600 can include linking the information resource to a response template. In some cases, this can be performed by an IT support user as they are generating templates from responding to the help requests as described herein. For example, an IT support user may locate one or more information resources based on an assigned help topic or other metadata associated with the information resource, and select which of the information resources to include in a template. In other cases, the support system can be configured to automatically associate one or more information resources with a particular response template based on a help topic or other metadata associated with the information resource. In some cases, an IT support user can assign one or keywords to a response template to associate the response template to one or more a help topic(s). This can be done manually by the It support user or these can be imported from an information resource linked to the response template.

Figure 7:
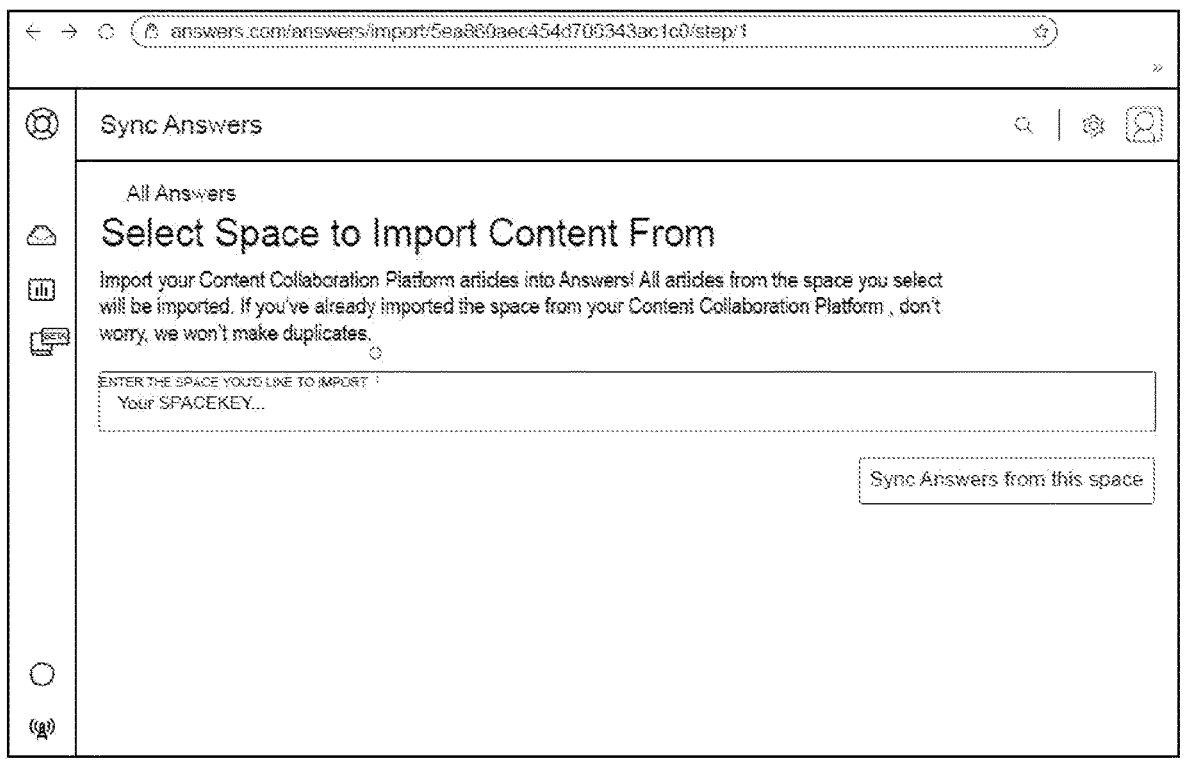
FIG. 7 shows an example interface for importing an information resource from an information network.

FIG. 7 shows an example interface 700 for importing an information resource from an information network. The interface 700 may allow a user to synchronize all information resources from a particular database with a support system such as support system 106 described herein. In this regard, the support system can use these information resources directly or information resources contained in the database can be modified as described herein.

Figure 8:
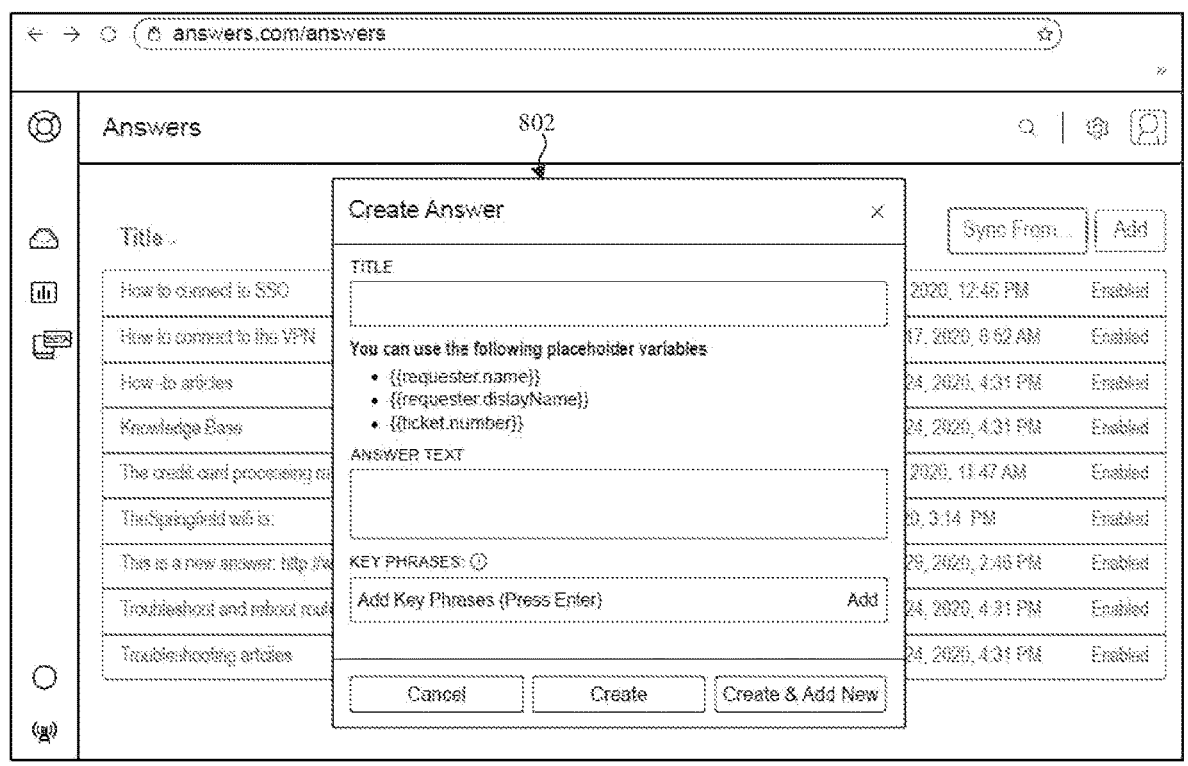
FIG. 8 shows an example interface for creating or modifying an information resource.

FIG. 8 shows an example interface 800 for creating or modifying an information resource from a collaboration platform. The interface 800 can be initiated in response to selecting an option to add an information resource such as the add option 508 shown in FIG. 5. Selecting the add option 508 can launch a resource creation interface 802, which can be used to add a new information resource to the support system. The resource creation interface 802 can include an option to create a tile for the information resource, to add text, which can include embedded functions as described herein, and/or add key phrases such as a help topic associated with the information resource. In some cases, the resource creation interface 802 is used by an IT support user to create a response template as described herein.

Figure 9A:
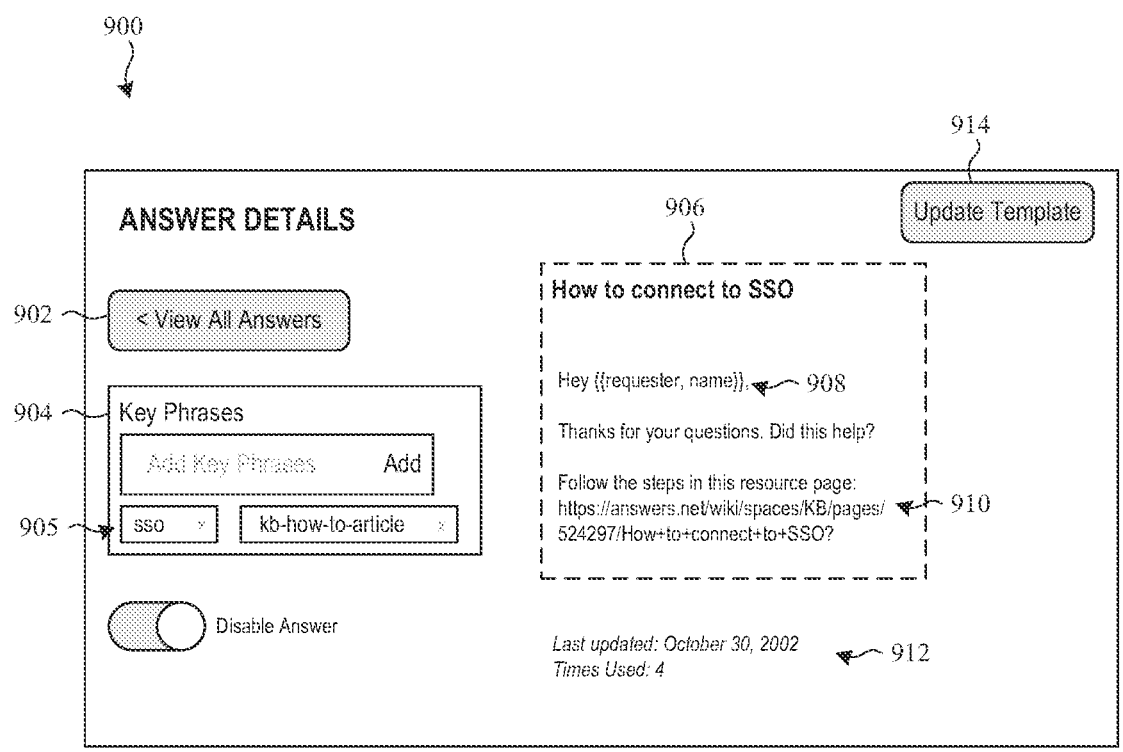
FIG. 9A shows an example response template.

FIG. 9A shows an example response template 900, which can be viewed and/or edited by an IT support user. The response template 900 can be displayed in an IT user interface when a user selects one of the response templates such as by selecting a response template 504 from list 502 as shown in FIG. 5. In other cases, the response template 900 can be generated in response to a user creating a new response template, for example using resource creation interface 802 shown in FIG. 8.

The response template 900 can include an option 902 to return to the list of other answers. The response template 900 can also include an interface 900 for associating the response template 900 with one or more help topics or issues. The interface 904 can allow an IT user to add keywords 905 to the response template 900 which can be used to generate metadata that is used to identify response templates that can be used to response to a help request as described herein. In some cases, the keywords 905 can be automatically generated or extracted from information resource when it is linked to a response template. These keywords 905 can be removed by an IT user.

The response template 900 can also include a message field 906, which can display a message that will be included in the response message. The message field can include one or more embedded functions 908 that can be used to auto-generate content in the message, which can be pulled from the help request, channel information, the information resource, content collaboration platform, or other source. The message field 906 can also include a reference to resource 910, which can be a link that when selected, opens the resource on a client device. In some cases, the response template 900 can include other information 912, such as when the response template 900 was last updated, the amount of times it has been used, a score associated with the template, and so on. The response template 900 can also include a selectable element 914 for editing the response template 900.

Figure 9B:
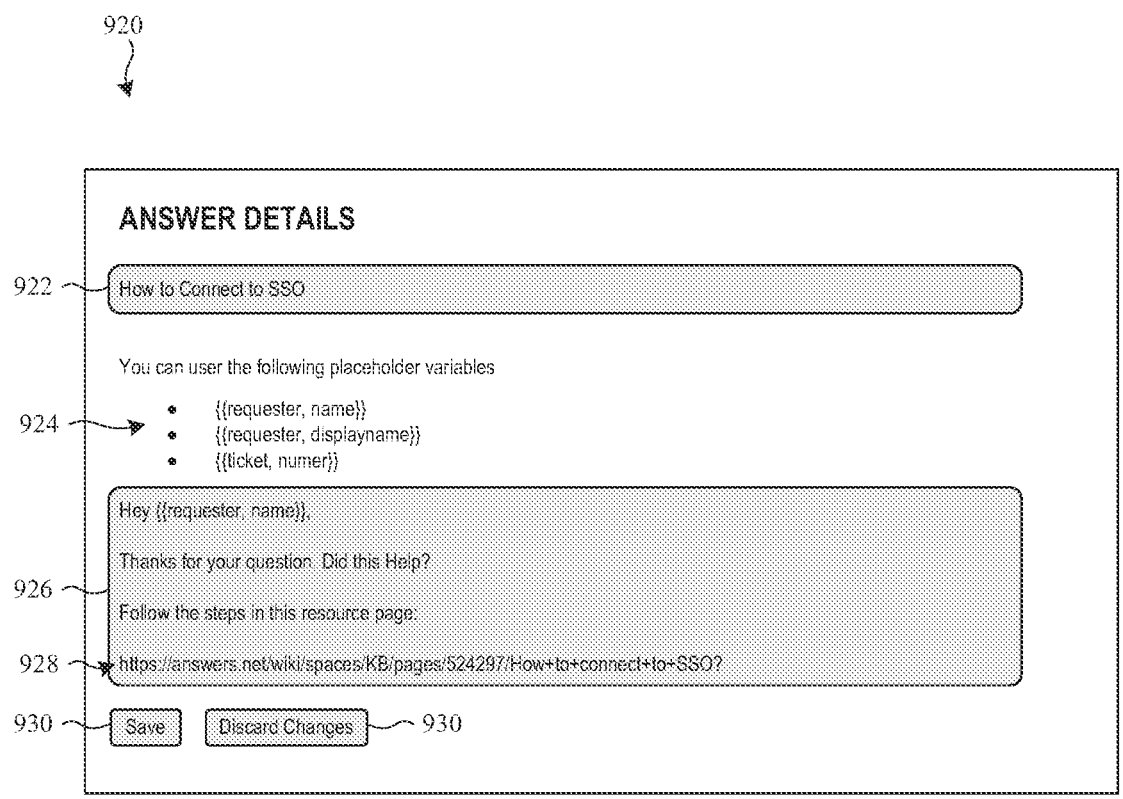
FIG. 9B shows an example interface for editing a response template.

FIG. 9B shows an example template editing interface 920 for editing a response template such as response template 900. The template editing interface 920 can include an editable title section 922 that allows an IT user to create a title for the response template, which can be used to identify the template response such as the template responses 504 shown in list 502 in FIG. 5. The template editing interface 920 can also include an embedded functions section 905, which can provide embedded functions that can be used to generate a response template. In some cases, the embedded function section 924 can include popular/commonly used embedded functions. In other cases the embedded functions section 924 can include supported functions. In other cases, additional embedded functions cane be added or removed by an IT user. In some cases, an IT user can include other embedded functions (e.g., one that are listed in the embedded function section 924) in the response template.

The response template 900 can include an editable message portion 926 in which an IT support user can create a message. The message portion 926 can include a combination of text, icons, embedded functions, or the like as described herein. The message portion 926 can also include a referent to an information resource 928, which can include a selectable link, instructions for solving an issue identified in a help request, or any other suitable information that may help a user solve their issue. The response template can also include a save option 930, and an option to discard any changes 930.

Figure 10:
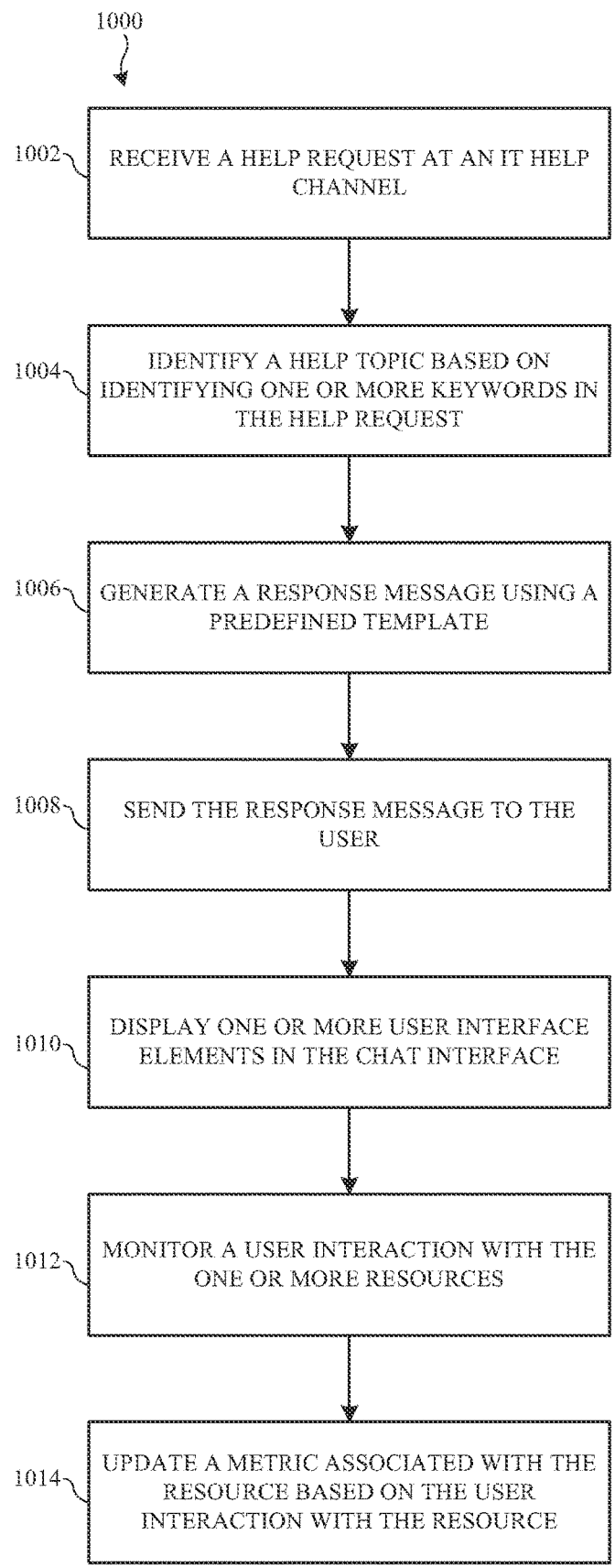
FIG. 10 shows an example process for generating a response message to a help request and evaluating a user interaction with an information resource included in the response message.

FIG. 10 shows an example process 1000 for generating a response message to a help request and evaluating a user interaction with an information resource included in the response message. The process 1000 can be used to automatically generate and send a response message to a help request. For example, in response to a user submitting a help request, the issue management system 100 can be configured to automatically send a response message that includes one or more information resources based on identifying a help topic from the help request.

At step 1002, the process 1000 can include receiving a help request at an IT help channel. The help request can be formatted as described herein and can include a message portion that identifiers an issue the user is experiencing. The help request can include additional data such as a user information, time of the request, and/or other data related to the help request or the issue as described herein.

At step 1004, the process 1000 can include identifying a help topic associated with the issue based on identifying one more keywords from the message portion of the help request. In some cases, this can include performing a keyword search, natural language processing, or other textual analysis to identify an issue that the user is experiencing. In some cases, the identified issue can be used to associate one or more help topics with a help request. For example, if the user types a message that they are having issues signing onto their account, the issue management system may identify a sign on issue based on processing the help message. The issue management system may associate the help request as relating to a "single sign-on" help topic or other sign on help topic such as a "user authentication" help topic.

At step 1006, the process 1000 can include generating a response message to the help request. The response message can include a predefined template as described herein, which may include one or more embedded functions that can be updated using information generated from the help request such as a name of the user, a description of the problem they are experiencing, and so on.

At 1008, the response message can be sent to the user. The response message can be shown in a chat thread that is associated with the help request as described herein. In some cases, the response message can reference one or more information resources that are being provided to the user in response to the help request.

At step 1010, the process 1000 can include displaying the information resource(s) in the chat interface. In some cases, the information resource can be a part of the response message and may be presented as text in the help request thread. In other cases, a reference to the information resource can be presented as a selectable user interface element, and when selected by the user, links to the information resource. In some embodiments, the information resource can be present as text, audio, or video that provides information for solving the issue identified from the help request.

At step 1012, the process 1000 can include monitoring a user interaction with the resource(s). In some embodiments, monitoring a user interaction with a resource can include determining whether a user interacted with the selectable element to view the resource, a time spent with the resource, whether the user closed a help desk ticket associated with the help request, and so on. In some cases, the issue management system can prompt the user to indicate whether the resource helped solve their issue. Additionally or alternatively, the user can be prompted to provide feedback on the effectiveness of the resource such as by rating the resource and/or response message.

At step 1014, the process 1000 can include updating a metric associated with the information resource based on the user interaction with the information resource. For example, the issue management system can assign scores to each information resource. The scores can be used to evaluate how often an information resource results in a help request being resolved. In some cases, the score can be used to determine which resource(s) are provided in a response message.

Figure 11:
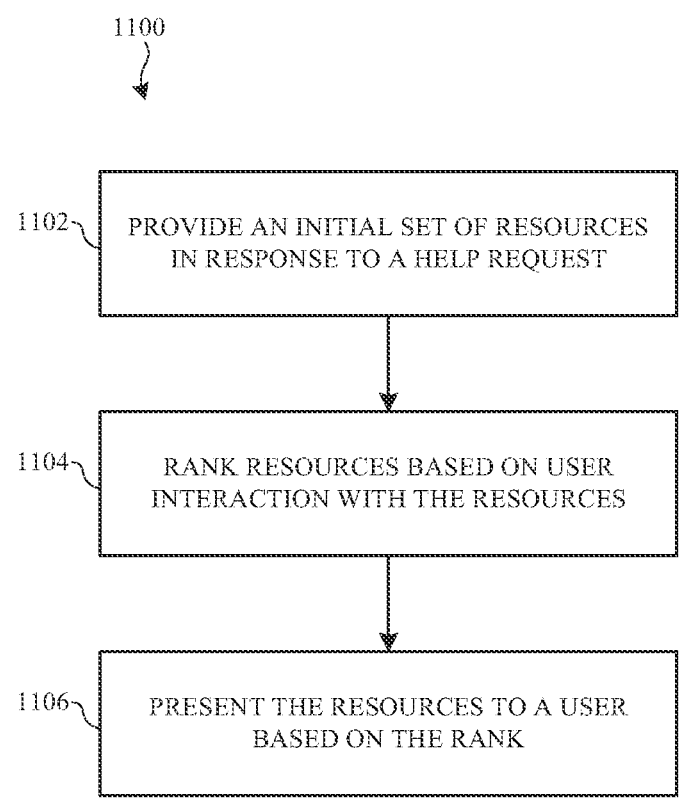
FIG. 11 shows an example process for ranking multiple resources each associated with a help topic.

FIG. 11 shows an example process 1100 for ranking multiple information resources each associated with a help topic. In some embodiments, information resources can be scored and ranked according to how effective they are at resolving a user's a particular issue or identified help topic.

At step 1102, the process 1100 can include providing an initial set of resources in a response message to a help request. In some cases, this can include presenting a first information resource in the chat interface and an option to view a second information resource. The issue tracking system can monitor a user's interaction with the response message. For example, the issue tracking system can determine if a user accessed or viewed a first resource or if the user selected an option to view a second information resource. In some cases, the issue tracking system can determine which of multiple information resources the user used to solve their issue. For example, the issue tracking system can determine the information resource that was last viewed prior to the user closing their help desk ticket.

At step 1104, the process 1100 can include ranking an information resource based on a user interaction with the information resource. For example, if an information resource is presented to a user and the issue tracking system determines that the information resource helped solve the help request, the score of the resource can be increased. If a first information resource is presented to a user and the user selects an option to view a second information resource, the score of the first information resource can be decreased. In this regard, the scores for each resource can be generated to determine an effectiveness of a resource at resolving issues associated with a particular help topic.

At step 1106, the process 1100 can include presenting the information resources to the user based on their rank. For example, in cases where multiple information resources are provided to a user, an information resource with the highest rank can be presented in the response message first. In this regard, more effective information resources may be identified and used more frequently.

Figure 12:
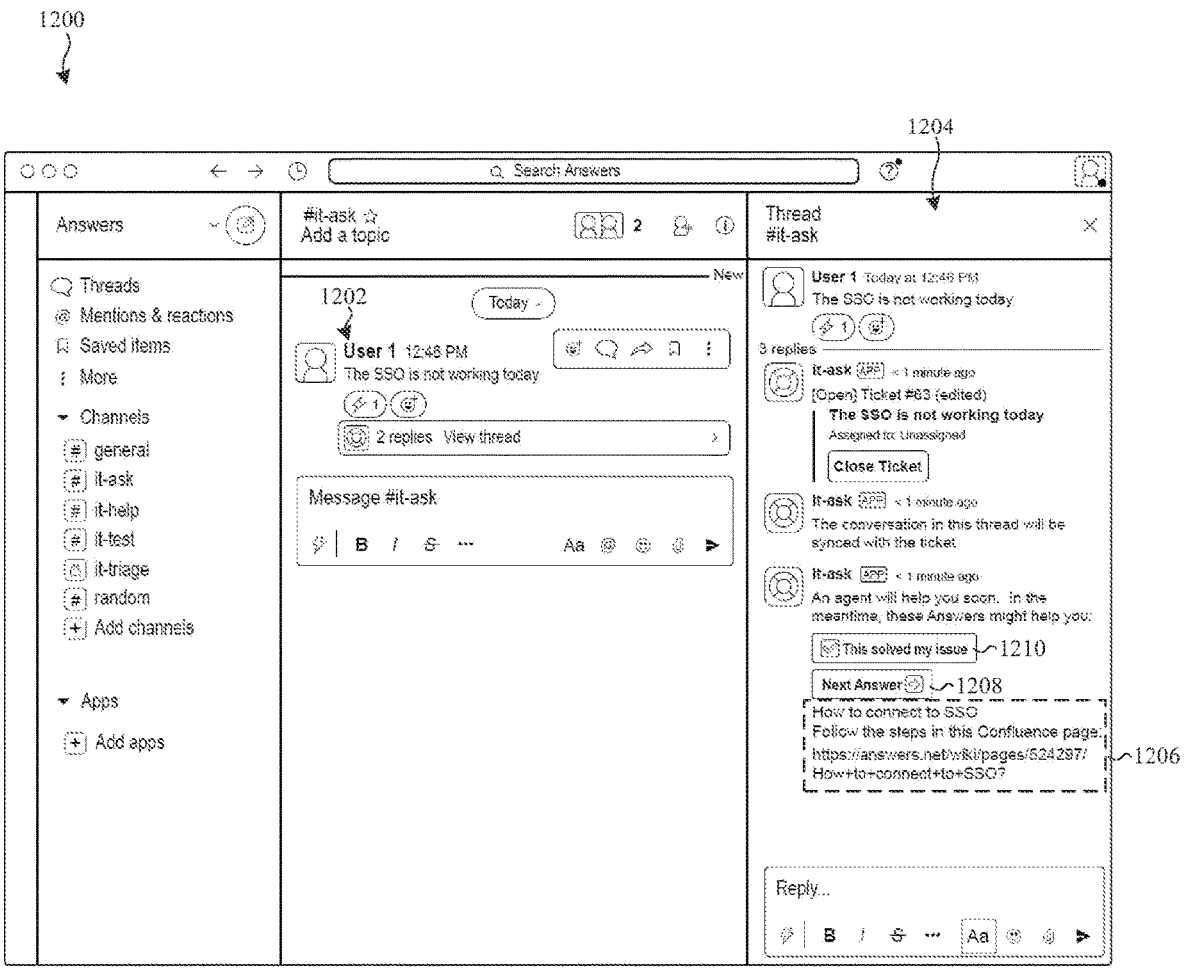
FIG. 12 shows an example chat interface including a response message to a help request and one or more resources associated with a help topic identified in the help request.

FIG. 12 shows an example chat interface 1200 including a response message to a help request and one or more resources associated with a help topic identified in the help request. The chat interface 1200 can be an example of the chat interfaces described herein such as chat interface 300. The chat interface 1200 can include a help request 1202, and a response pane 1203 including a response message to the help request. The response message can include a reference to an information resource 1204, which can include a selectable link to the information resource. The chat interface 1200 can also include an option to view a next information resource 1206 and a selectable interface element 1208 to indicate that the information resource solved the issue. In response to selecting the selectable link the information resource can be displayed to the user. In response to selecting the option to view the next information resource 1206, a new reference to a new information resource can replace the current reference to the information resource 1204. In response to selecting the interface element 1208, the issue tracking system can close the help desk ticket associated with the help request and adjust the score of the information resource as described herein.

Figure 13:
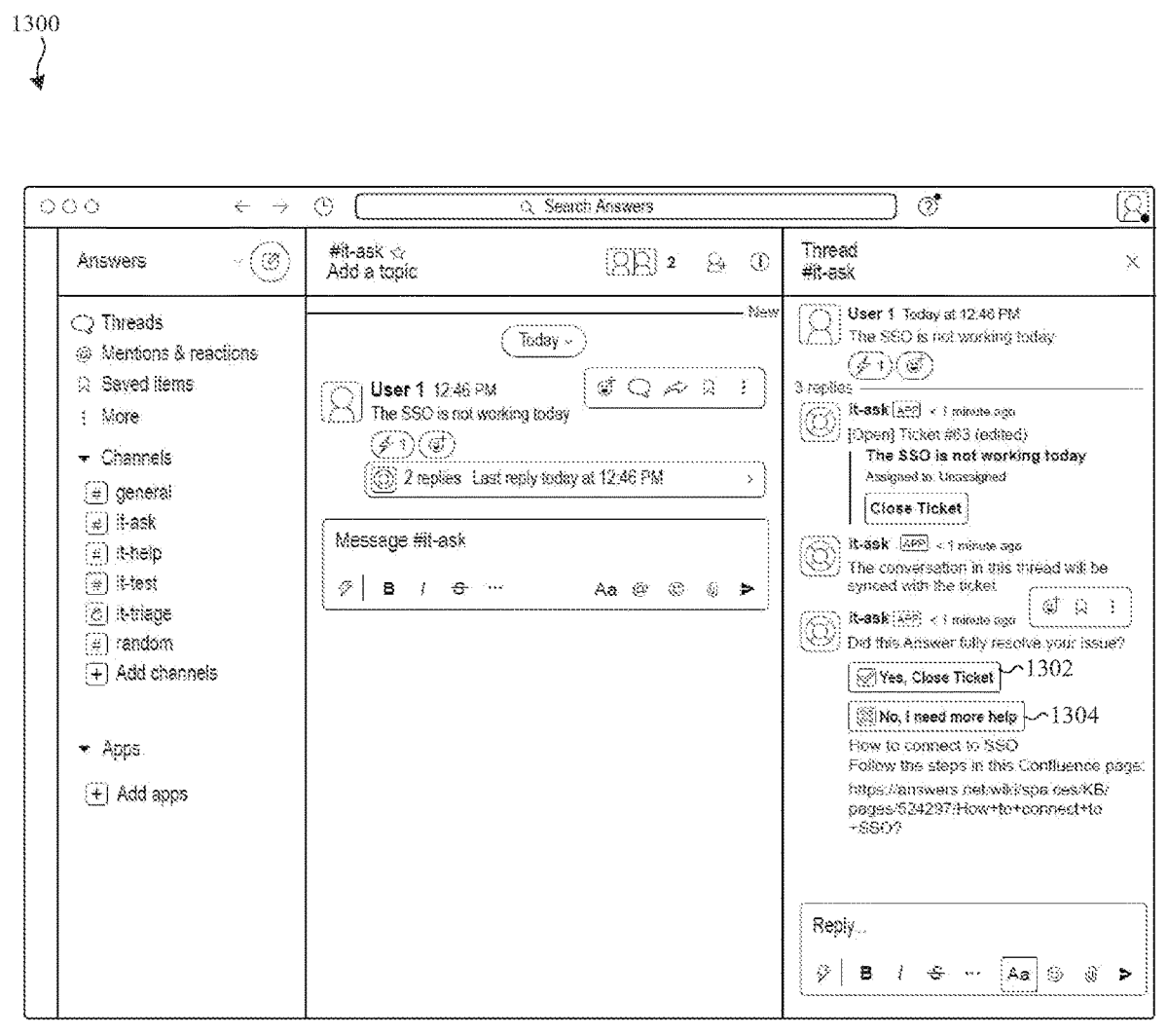

FIG. 13 shows an example chat interface 1300 that allows a user to close a help desk ticket associated with a help request or request additional help. The chat interface 1300 can be an example of the chat interfaces described herein such as chat interfaces 300 and 1100. In some cases, in response to a user interacting with an information resource such as selecting a link in the response message, the chat interface 1300 can be updated to include additional options for managing the help request. For example, the chat interface 1300 can display a first option 1302 that closes the ticket. If the first option 1302 is selected a score with the display information resource can be updated and the issue management system can characterize the help request as being resolved. The chat interface 1300 can also display a second option 1304 for the user to receive additional help. In some case, selecting the second option can cause a second information resource to be displayed. In other examples, selecting the second option can connect the user that submitted the help request to be connected with an IT support user.

Figure 14:
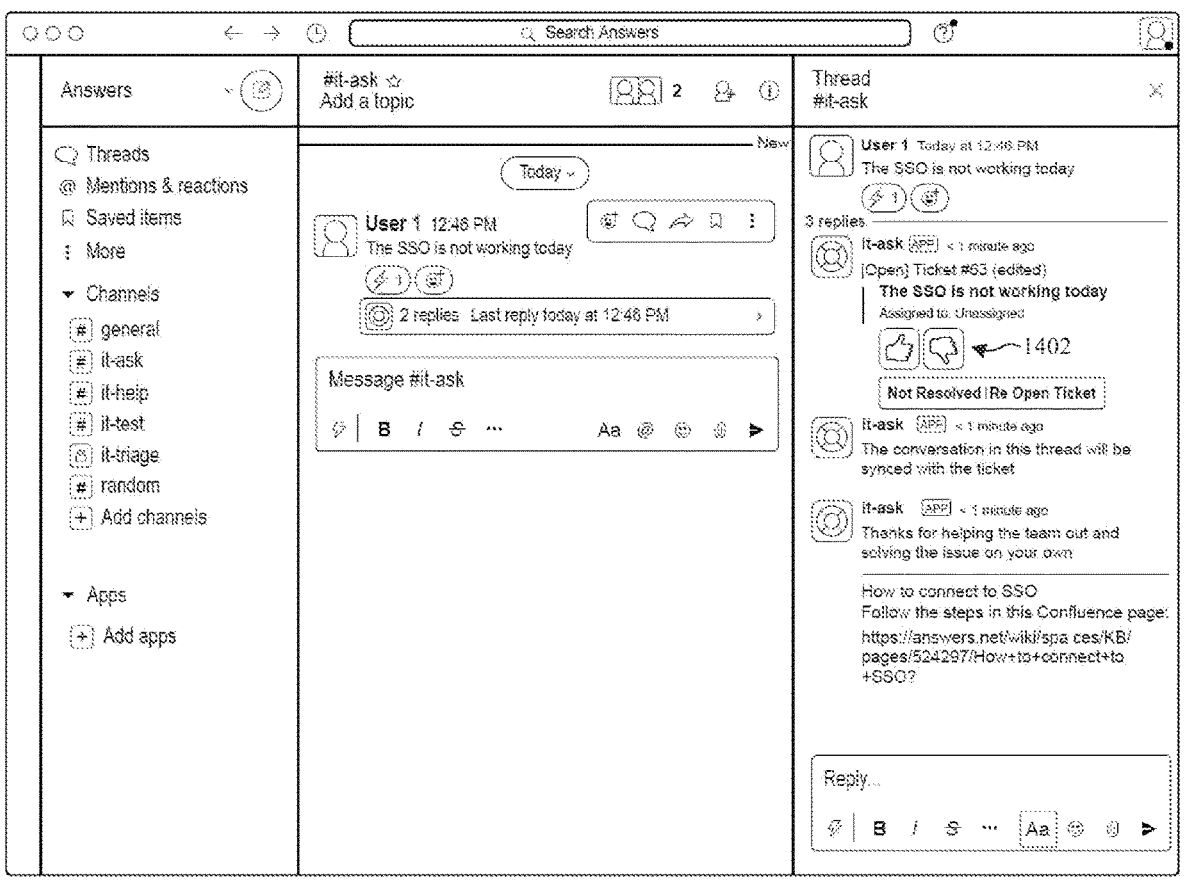
FIG. 14 shows an example chat interface that presents a user with an option for the user to rate an effectiveness of a response message to a help request.

FIG. 14 shows an example chat interface 1400 that presents a user with an option 1402 to rate an effectiveness of a response message to a help request. The chat interface 1400 can be an example of the chat interfaces described herein such as chat interfaces 300, 1100 and 1200. As described herein the user rating of a particular information resource can be used to adjust a score associated with the user interface. For example, if the user provides a positive rating, a score associated with the information resource can be increased, and if the user provides a negative rating, the score for the information resource can be decreased. In some cases, if a score for an information resource falls below a certain threshold, it can be removed from the issue management system. In other cases, the issue management system can prompt an IT support user to modify or change an information resource based on the score or user rating. For example, if a score of an information resource drops below a defined threshold, the issue management system can alert an IT support user, which can prompt the IT support user to modify the resource or create a new information resource.

Figure 15:
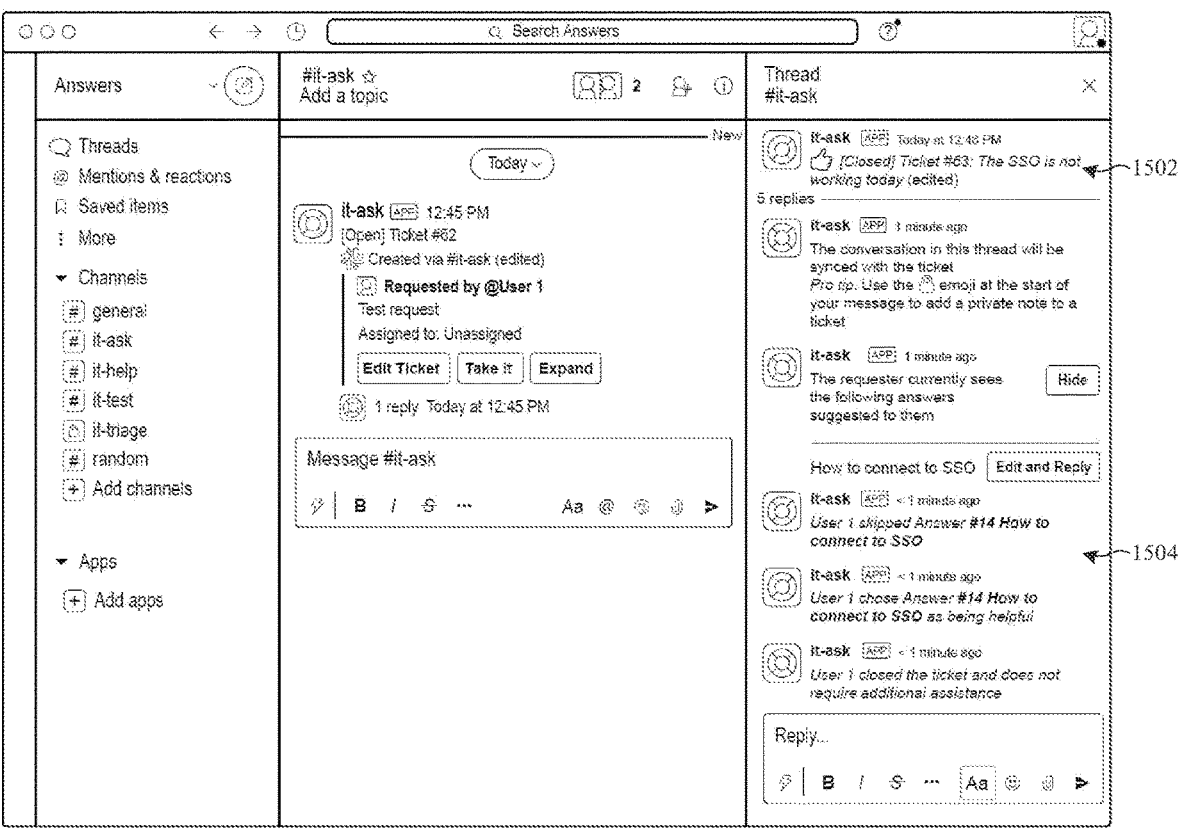
FIG. 15 shows an example chat interface for a support group that shows a user's interaction with a response message to a help request.

FIG. 15 shows an example chat interface 1500 for a support group that shows a user's interaction with a response message to a help request. The chat interface 1500 can be an example of the chat interfaces described herein such as chat interface 300. In response to a closed ticket the chat interface 1500 can be updated to show a closed ticket status 1502 for the help request. Additionally or alternatively, the chat interface 1500 can include a response summary 1504 that indicates a user's interaction with the response message. For example the response summary 1504 can include an indication of whether a user skipped an information resource, which, if any, of the information resources helped the user resolve their issue, whether a user viewed one or more of the information resources, or other information related to a user's interaction with the information resource such as an amount of time spent viewing each resource.

Figure 16:
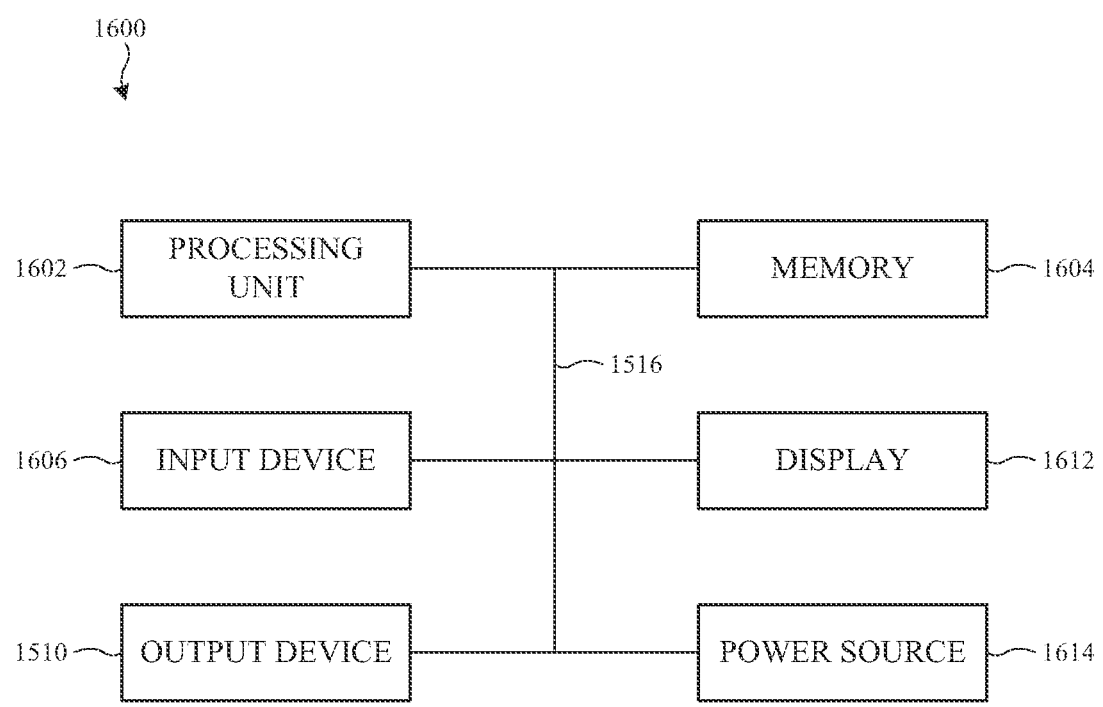
FIG. 16 shows an example electrical block diagram of an electronic device that may perform the operations described herein.

FIG. 16 illustrates a sample electrical block diagram of an electronic device 1600 that may perform the operations described herein. The electronic device 1600 may in some cases take the form of any of the electronic devices described with reference to FIGS. 1-15, including client devices 102, and/or servers or other computing devices associated with the chat system 104, the support system 106, and the collaboration platform 114. The electronic device 1600 can include one or more of a display 1612, a processing unit 1602, a power source 1614, a memory 1604 or storage device, input devices 1606, and output devices 1610. In some cases, various implementations of the electronic device 1600 may lack some or all of these components and/or include additional or alternative components.

The processing unit 1602 can control some or all of the operations of the electronic device 1600. The processing unit 1602 can communicate, either directly or indirectly, with some or all of the components of the electronic device 1600. For example, a system bus or other communication mechanism 1616 can provide communication between the processing unit 1602, the power source 1614, the memory 1604, the input device(s) 1606, and the output device(s) 1610.

The processing unit 1602 can be implemented as any electronic device capable of processing, receiving, or transmitting data or instructions. For example, the processing unit 1602 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1600 can be controlled by multiple processing units. For example, select components of the electronic device 1600 (e.g., an input device 1606) may be controlled by a first processing unit and other components of the electronic device 1600 (e.g., the display 1612) may be controlled by a second processing unit, where the first and second processing units may or may not be in communication with each other.

The power source 1614 can be implemented with any device capable of providing energy to the electronic device 1600. For example, the power source 1614 may be one or more batteries or rechargeable batteries. Additionally or alternatively, the power source 1614 can be a power connector or power cord that connects the electronic device 1600 to another power source, such as a wall outlet.

The memory 1604 can store electronic data that can be used by the electronic device 1600. For example, the memory 1604 can store electronic data or content such as, for example, audio and video files, documents and applications, device settings and user preferences, timing signals, control signals, and data structures or databases. The memory 1604 can be configured as any type of memory. By way of example only, the memory 1604 can be implemented as random access memory, read-only memory, Flash memory, removable memory, other types of storage elements, or combinations of such devices.

In various embodiments, the display 1612 provides a graphical output, for example associated with an operating system, user interface, and/or applications of the electronic device 1600 (e.g., a chat user interface, an issue-tracking user interface, an issue-discovery user interface, etc.). In one embodiment, the display 1612 includes one or more sensors and is configured as a touch-sensitive (e.g., single-touch, multi-touch) and/or force-sensitive display to receive inputs from a user. For example, the display 1612 may be integrated with a touch sensor (e.g., a capacitive touch sensor) and/or a force sensor to provide a touch- and/or force-sensitive display. The display 1612 is operably coupled to the processing unit 1602 of the electronic device 1600.

The display 1612 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 1612 is positioned beneath and viewable through a cover that forms at least a portion of an enclosure of the electronic device 1600.

In various embodiments, the input devices 1606 may include any suitable components for detecting inputs. Examples of input devices 1606 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1606 may be configured to detect one or more particular types of input and provide a signal (e.g., an input signal) corresponding to the detected input. The signal may be provided, for example, to the processing unit 1602.

As discussed above, in some cases, the input device(s) 1606 include a touch sensor (e.g., a capacitive touch sensor) integrated with the display 1612 to provide a touch-sensitive display. Similarly, in some cases, the input device(s) 1606 include a force sensor (e.g., a capacitive force sensor) integrated with the display 1612 to provide a force-sensitive display.

The output devices 1610 may include any suitable components for providing outputs. Examples of output devices 1610 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 1610 may be configured to receive one or more signals (e.g., an output signal provided by the processing unit 1602) and provide an output corresponding to the signal.

In some cases, input devices 1606 and output devices 1610 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1602 may be operably coupled to the input devices 1606 and the output devices 1610. The processing unit 1602 may be adapted to exchange signals with the input devices 1606 and the output devices 1610. For example, the processing unit 1602 may receive an input signal from an input device 1606 that corresponds to an input detected by the input device 1606. The processing unit 1602 may interpret the received input signal to determine whether to provide and/or change one or more outputs in response to the input signal. The processing unit 1602 may then send an output signal to one or more of the output devices 1610, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

Example computing resources or appliances that may be configured to perform the methods described herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. A computer implemented method for automatically identifying an issue from a help message received via a chat interface of a chat service and generating a response for responding to the help message, the method comprising:
   from within the chat interface, an input from a first user invoking a response template editor;
   generating a first response template comprising the steps of:
      receiving, via the response template editor, a first link to a first digital information resource of a content collaboration platform; and
      receiving, via the response template editor, one or more first keywords to the first response template;
   generating a second response template comprising the steps of:
      receiving, via the response template editor, a second link to a second digital information resource of the content collaboration platform; and
      receiving, via the response template editor, one or more second keywords to the second response template;
   receiving, a message within a help channel of the chat interface, a help request from a second user, the help request comprising a message text;
   in response to receiving the help request at the help channel:
      parsing the message text to identify a help topic;
      identifying a set of candidate templates having keywords that correspond to the help topic, the set of candidate templates comprising the first response template and the second response template;
      in response to receiving a selection of the first response template, sending a response message to the first user via the chat interface, the response message generated in accordance with the first response template and comprising the first link to the first digital information resource;
   monitoring, via the chat service, a user interaction with the response message;
   generating an estimated success of the response message based on the monitored user interaction;
   incrementing or decrementing a metric associated with the first response template based on the estimated success of the response message; and
   adjusting a ranking of the set of candidate templates based on the metric.

2. The method of claim 1, wherein the first digital information resource and the second digital information resource are pulled from an information network that comprises information resources that are generated by users of the content collaboration platform.

3. The method of claim 2, wherein:
   the first digital information resource, the second digital information resource or both are modified by the first user;
   the first link links to a modified version of the first digital information resource; and
   the second link links to a modified version of the second digital information resource.

4. The method of claim 1, wherein selecting the first link causes the first digital information resource to be displayed on a device of the second user.

5. The method of claim 1, wherein the first digital information resource is formatted as an audio resource or a video resource.

6. The method of claim 1, wherein the message text comprises a reference to a hardware component that the second user is requesting help with.

7. The method of claim 1, wherein in response to the second user selecting the first link, the chat interface displays an option for the second user to rate the response message.

8. The method of claim 7, wherein:
   the rating is used to determine the metric for the first response template; and
   the method further comprises suggesting the first response template for use in a subsequent response message based on the metric.

9. A computer implemented method for automatically generating a response to a help request at a chat interface of a chat service where the response includes one or more information resources related to an issue identified in the help request, the method comprising:
   receiving the help request from a user at the chat interface of a help channel;
   parsing the help request to identify a help topic;
   identifying a set of candidate templates having keywords that correspond to the help topic, the set of candidate templates comprising a first response template with a first link to a first digital information resource and a second response template with a second link to a second digital information resource;
   in response to receiving a selection of the first response template, generating a response message using the first response template;
   displaying the response message at the chat interface; and
   monitoring, via the chat service, a user interaction with the response message;
   generating an estimated success of the response message based on the monitored user interaction;
   incrementing or decrementing a metric associated with the first response template based on the estimated success of the response message; and
   adjusting a ranking of the set of candidate templates based on the metric.

10. The method of claim 9, wherein identifying the set of candidate templates comprises:
    sending one or more templates to a support user group; and
    receiving a selection of the first response template from the one or more templates from the support user group.

11. The method of claim 9, wherein the first digital information resource is at least partially based on information contained within an information network.

12. The method of claim 11, wherein the first digital information resource is generated by changing the information from a text based format to an audio or video based format.

13. The method of claim 9, wherein displaying the response message further comprises displaying a user interface option to skip the first digital information resource and display a second information resource related to the help topic.

14. The method of claim 9, further comprising:
    increasing the metric associated with the first digital information resource in response to the user indicating that first digital information resource did resolve the help request; and
    decreasing the metric associated with the first digital information resource in response to the user indicating that the first digital information resource did not resolve the help request.

15. The method of claim 14, wherein:
selecting the first response template comprises selecting a response template from a list of response templates; and an order of the list of response templates is at least partially based on metrics associated with each response template in the list of response templates.

16. A computer implemented method for identifying an issue from a help message received via a chat interface of a chat service and generating a response to the help message, the method comprising:

receiving, from a first user, a help request via the chat interface of a help channel, the help request comprising message text;

in response to receiving the help request at the help channel:

parsing the help request to identify a help topic;

identifying a set of candidate templates having keywords that correspond to the help topic, the set of candidate templates comprising a first response template with a first link to a first digital information resource and a second response template with a second link to a second digital information resource;

in response to receiving a selection of the first response template, sending a response message to the first user via the chat interface, the response message generated in accordance with the first response template and comprising the first link to the first digital information resource;

monitoring, via the chat service, a user interaction with the response message;

generating an estimated success of the response message based on the monitored user interaction;

incrementing or decrementing a metric associated with the first response template based on the estimated success of the response message; and adjusting a ranking of the set of candidate templates based on the metric.

17. The method of claim 16, further comprising:

displaying, in the response message, a user interface element that allows the first user to indicate that the response message solved the help request; and in response to the first user selecting the user interface element, closing a help desk ticket associated with the help request.

18. The method of claim 16, wherein the first response template and the second response template were generated by a second user.

19. The method of claim 18, wherein the first digital information resource associated with the first response template and the second digital information resource associated with the second response template are selected by the second user from an information network that comprises information resources that are generated by users of a collaboration platform.

* * * * *